(Model.)

A. E. FRANCIS.
NUTMEG GRATER.

No. 251,427. Patented Dec. 27, 1881.

Witnesses:
M. M. Francis
Jenny L. Francis

Inventor:
Alan E. Francis

UNITED STATES PATENT OFFICE.

ALLAN E. FRANCIS, OF CLEVELAND, OHIO.

NUTMEG-GRATER.

SPECIFICATION forming part of Letters Patent No. 251,427, dated December 27, 1881.

Application filed March 21, 1881. (Model.)

*To all whom it may concern:*

Be it known that I, ALLAN E. FRANCIS, of Cleveland, in the county of Cuyahoga and State of Ohio, have invented a new and useful Improvement in Graters, which improvement is fully set forth in the following specification, reference being had to the accompanying drawings.

The object of my invention is to make an effectual grater that will rapidly and conveniently grate nutmegs, chocolate, cocoa-nut, horseradish, rusk, &c., and so constructed as to be easily operated and cleaned. For the purposes above named two sizes are necessary—one small grater, to be held in the hand and used for nutmegs only, and a large size for other articles.

Figure 1:
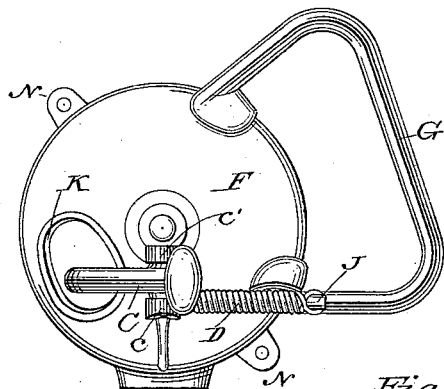
Figure 2:
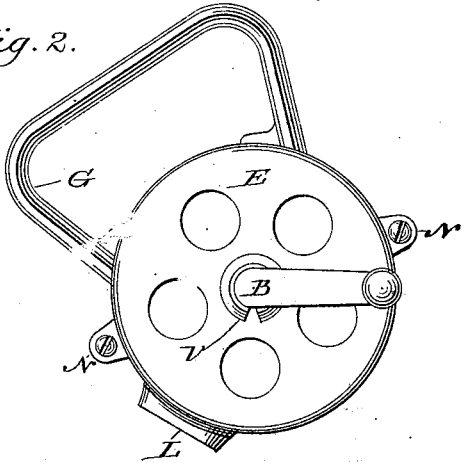
Figure 4:
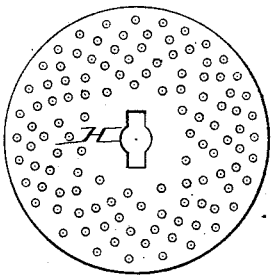
Figure 3:
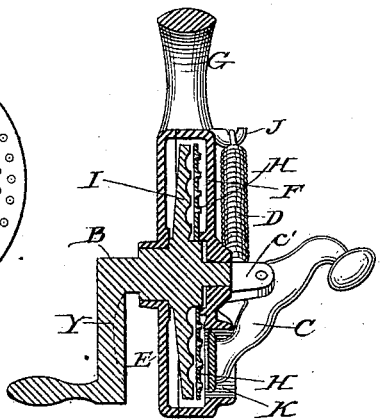

The small grater is fully shown in Figures 1, 2, 3, 4, and 7. Fig. 1 is a view of one side; Fig. 2, the opposite side; Fig. 3, a sectional view on a plane indicated by dotted line on Fig. 1. Fig. 4 is the grater.

The device thus shown is composed of a circular cast-iron case formed of two disks, F and E, the edge of each rounded in to meet that of the other, leaving, when closed, the interior wide enough to receive the grater H and its cast-iron support I. The grater H is a circular piece of tinned iron, stamped in dies that form the usual grating-surface in a circle around its center. In the center a hole is cut corresponding in shape to the form of its bearings. The journal, grater-support, and crank are cast in one piece. (Shown in Fig. 7.) The support is a thin flange on the journal, same size as grater, with contact-surface corrugated to admit gratings that pass through the grater, freeing themselves and dropping out. To the edge of one side handle G is cast, and below this an opening, L, through which the gratings fall. In the center of each half of the case F and E is a bearing for the journal. The one in E has a notch, V, in its outer portion, through which the narrow portion Y of the crank passes, thus admitting the crank to pass through a hole that would otherwise be objectionably large. In the opposite side of the case F, near its outer portion, is a hole, K, in which the article to be grated is placed, and there held in contact with the grater by pressure derived from coiled spring D, attached at one end to a hook, J, and at the other end to a hook on the presser-arm C, which is hinged between the two lugs C and C'. Each portion of the case is provided with two small lugs, N N, by which it is put together with screws.

Figure 6:
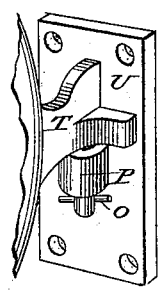

The large grater would not be desirable if made to hold in the hand, yet, as it must often be cleaned, it would not do to screw it to the wall. To make it secure when in use and easy to remove to clean, I make a fastening, as shown in Fig. 6.

Instead of casting to the case the handle G, it is provided with fastening T, which passes through staple P on plate U, and is there secured by pin O. Plate U is screwed to the wall.

Figure 5:
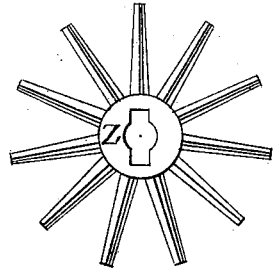
Figure 7:
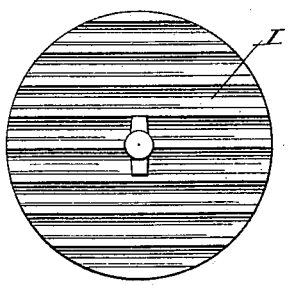

To provide against clogging in grating soft substances, I insert the large-size iron mat shown in Fig. 5 between the grater and its support, thus giving a free outlet to all stuff passing through the openings in the grater.

I claim—

1. The grater-supporting disk I, with its shaft and crank cast in one piece, as shown and described.

2. The grating-disk H, having a slotted central opening, and fitted to the bearing of the supporting-disk I, and operating in combination therewith, substantially as and for the purpose specified.

3. The combination of the two disks F E, one of which has a handle, G, and provided with opening K, and a pressure-lever, C, pivoted between the lugs c c, with its spring D, the said disks, when secured together at the ears or lugs N N, forming the casing in which the aforesaid grating-disk H and supporting-disk I are operated, all constructed and operating substantially as described.

4. The slotted mat Z, in combination with the supporting-disk I.

ALLAN E. FRANCIS.

Witnesses:
M. M. FRANCIS,
JENNY L. FRANCIS.